Dec. 23, 1969 W. VOLK 3,485,447
SLIDE RULE
Filed Jan. 23, 1968 2 Sheets-Sheet 2

INVENTOR.
WILLIAM VOLK
BY V. F. Volk
his agent

United States Patent Office 3,485,447
Patented Dec. 23, 1969

3,485,447
SLIDE RULE
William Volk, 44 Wheatsheaf Lane,
Princeton, N.J. 08540
Filed Jan. 23, 1968, Ser. No. 699,832
Int. Cl. G06g 1/02
U.S. Cl. 235—70                                    1 Claim

ABSTRACT OF THE DISCLOSURE

A slide rule has scales formed by dividing a logarithmic scale from 1 to 10 into an integral number of divisions. Each of the fixed scales is identified by two numerals differing by the number of such divisions, and on the slide, the left hand index of the scales are identified by numerals that are lower by 1 than identifying numerals on the right hand index.

BACKGROUND OF THE INVENTION

It is well known that the precision of the commonly used logarithmic slide rule is a function of the length of the scale. Efficient use of the entire length of a slide rule for bearing scale graduation has, however, been prevented by two factors. Firstly, the cursor is required to have a substantial breadth in order to keep the hairline vertical. In conventional slide rules no scale graduations have appeared on those portions of the rule that cannot be reached by the hairline and due to the breath of the cursor this unmarked length may be substantial. Secondly, in the type of rule that bears scales on both faces, and this has been the most efficient type up to the present time, the brackets that hold the parallel plate members apart themselves limit the movement of the cursor and account for additional slide rule length that is not available for scales.

It was long ago suggested that the precision of a slide rule of a given length might be greatly increased by breaking up a longer scale at lengths representing integral roots of ten where the integer is greater than one, such as the square root, and fourth root of ten, and arranging the broken scale in parallel lines of the rule. This arrangement is suggested, for example in Anderson Patent 768,971 issued in 1904. In spite of the apparent advantages of the concept, however, slide rules made up in this manner are not commonly used. It may be reasonably proposed that one explanation for the commercial failure of the divided scale has been the inconvenience of having calculations where the required answer appears off-scale due to the fact that the wrong index, e.g., the right instead of the left index or vice versa, of the scale on the slide was initially employed. The folded and inverted scales that are well known to persons skilled in slide-rule calculating have been added to the known slide rules to alleviate this inconvenience. But when the slide rule area is used for divided scales there is no room available for the folded and inverted scales and they must be sacrificed. My present invention, which reduces the likelihood of reading off-sale, has, therefore, particular utility to slide rules with divided scales and makes such slide rules practical for every-day use.

By means of my invention I propose to make a practical slide-rule of increased precision for a given length.

By means of my invention I propose further to greatly increase convenience of slide rules having divided scales.

SUMMARY OF THE INVENTION

I have invented a slide rule comprising two fixed elongated plates with means holding them in spaced parallel relation and a third elongated plate movable lengthwise between the fixed plates. Left and right indices are marked in equal spaced apart distances on the plates. Logarithmically spaced scales are graduated on the plates designating values between the right and left indices of exactly an integral root of the number ten. The scale graduations on the third, slidable, plate extend substantially to the left of the left index and to the right of the right index so that advantage is taken of the full length of the slide, and, to make the indices more legible they are extended across all the scales on the slidable plate. My slide rule also comprises a cursor having a hairline extending across the scales. In advantageous embodiments of my invention the integral root of the number ten is greater than one, such, particularly, as four.

To make it easier to determine which scale to read when using my slide rule consecutively each scale on the fixed plates bears two identifying numerals comprising a first numeral from 1 to N, where N is the integer of the integral root of 10 to which the scale is divided, and a second numeral equal to said first numeral plus N. The scales on the slide bear consecutive identifying numerals from 0 to (N−1) at the left and from 1 to N at the right.

A more thorough understanding of my invention can be gained from a study of the drawings as described hereinbelow.

DETAILED DESCRIPTION OF A PREFERRED EMBODIMENT

Figures 1, 2:
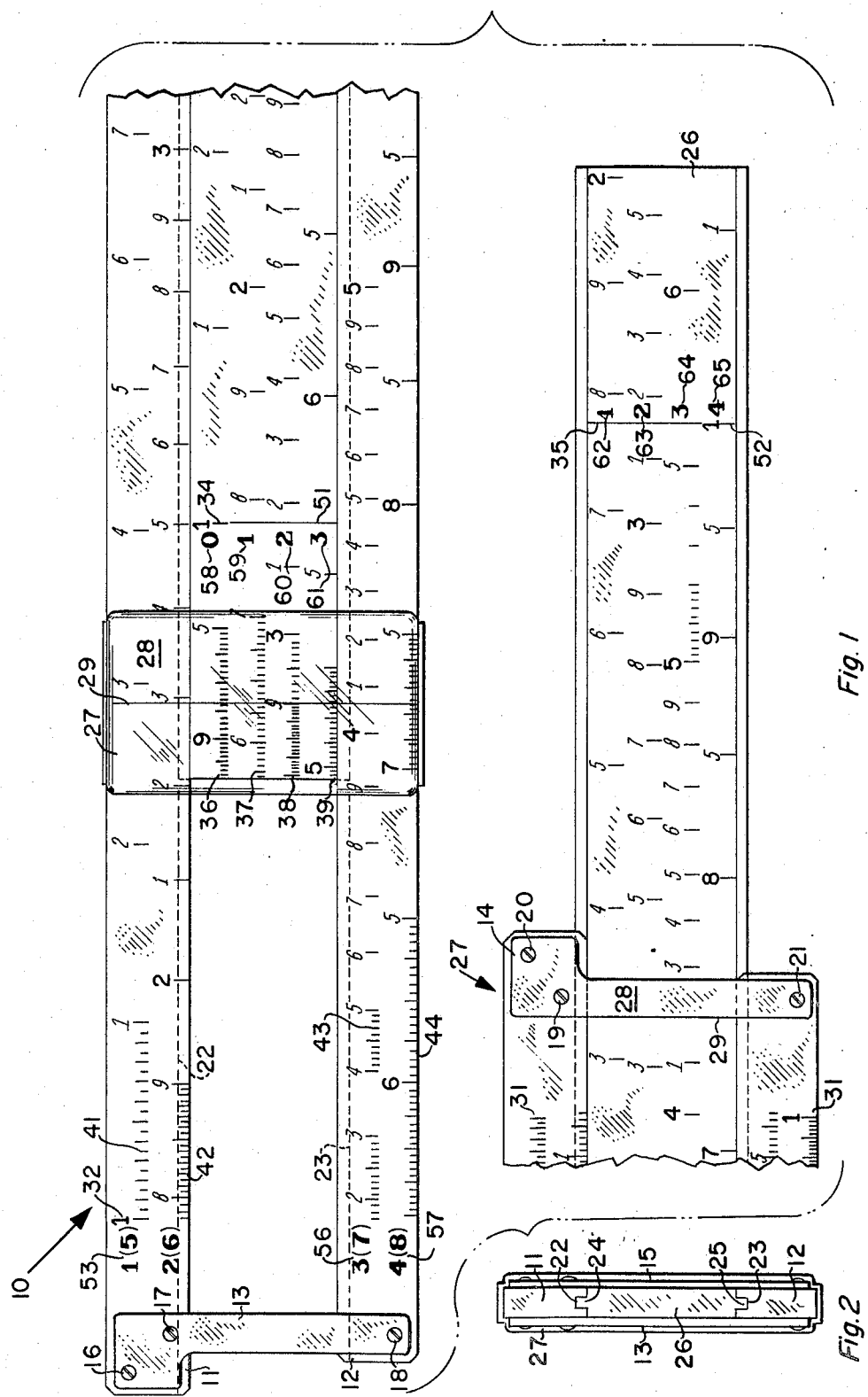
FIGURE 1 shows a broken front view of a slide rule made to my invention.
FIGURE 2 shows a view of the slide rule of FIGURE 1.

Referring to FIGURE 1 a slide rule indicated generally by the numeral 10 comprises an upper elongated plate 11 and a lower plate 12 held apart, but parallel, by brackets 13 and 15 (FIGURE 2) on one end and a bracket 14 and a matching bracket (not shown) on the other, co-operating with rivets 16–21. The plate 11 has a lower groove 22 and the plate 12 an upper groove 23 matching tongues 24, 25 in a sliding plate 26 that is free to slide between the plates 11 and 12. A cursor 27 with a transparent plate 28 bearing a central hairline 29 will, when it is in its furthest right position, have the plate 28 almost abutting the bracket 14. A right index 31 marks the right limit of the graduations on plates 11 and 12 and a left index 32 marks the left limit. The description of the slide rule 10 that has been given so far is typical of known slide rules and it is apparent that the length of such known rules from their left extremities such as that shown at 33 to the left index is wasted for purposes of calculation and a similar waste occurs at the right end of the rule.

The length of the distance between the left index 32 and the right index 31 is fixed and limits the precision or sensitivity of the rule. This exact distance is repeated between a left index 34 and a right index 35 of the sliding plate 26. However it is novel in my slide rule that scales such as scales 36, 37, 38, 39, which will be more fully described hereinbelow, on the slide 26 extend substantially leftward of the index 34 and rightward of the index 35.

In FIGURE 1 the logarithmic scale has been divided into four lengths two of which appear on the plate 11 and two on the plate 12, as follows. A scale 41 extends from 1 at the left hand index 32 to the fourth root of 10, of which 1.78 is an approximation, at the right hand index. A scale 42 extends from the fourth root of ten to the square root of ten, of which 3.16 is an approximation, at the right hand index. A scale 43 on the plate 12 extends from $10^{1/4}$ to $10^{3/4}$ of which 5.62 is an approximation, and a scale 44 extends from $10^{3/4}$ at the left hand index to 10 at the right hand index. In order to increase ease of reading, the scales on the fixed plates may be extended slightly past the indices in order to indicate a whole division but there is no advantage to make any substantial extension of these scales since the hairline 29 on the cursor could not reach them, as has been explained. In fact, for purposes of gaining the utmost precision from the available slide rule space, it is desirable to extend the left and right indices as far apart as possible on the fixed plates 11 and 12.

Between the indices 34 and 35 on the slide 26 the scales 36–39 are identical to the scales 41–44 but I have extended the scales 36–39 beyond the indices 34 and 35 to the extremity of the slide. In a 5-inch slide rule the increased scale may extend as much as one inch or more on each end, a total increase of at least 40%. To illustrate the advantage of my extended scales let us suppose that it is desired to multiply "25" by "29," as illustrated in FIGURE 1, and the left index 34 of the slide 26 is placed in line with "25" on scale 42 of the upper plate 11. When an attempt is made to move the cursor to the number "29" on scale 32 of the slide this number is found to be off scale. However, on my improved slide rule "29" also appears on scale 38 to the left of the left index and reading under this scale the correct product "725" is found under the hairline on scale 44 of the lower plate. Although there will still be occasions when the desired answer may be off scale, the 40% increase of graduations on the scale presents a highly significant advantage for my improved rule, indeed an increase of only 20% that is, an extension on a five-inch slide of one half inch on either end constitutes a significant advantage over present rules and makes the use of divided scale rules practical, in terms of the time that can be saved by the user.

Although the left index 34 is always identifiable by the graduations marking the number 1 on the scale 36 and the right index 35 by the graduations marking the number 10 on the scale 39 I have found that my slide rule can be more easily read if I extend the graduations from the left and right indices across all the scales by means of line markings 51, 52.

Use of divided scale rules have, up to now, been resisted because of the possibility of reading the answer on the wrong scale. I have added novel markings to my rule that removes the basis for such resistance.

Thus I have marked the scale 41 with the numerals "1" and "5" as indicated at 53, the scale 42 is marked at 54 by the numerals "2" and "6," the scale 43 is marked at 56 with numerals "3" and "7" and the scale 44 is marked at 57 with numerals "4" and "8." The first of the numerals in each case is a numbering from 1–N of the scales on the fixed plates. Since N represents the integral number of division that the log scale is divided into, and, in the illustrated case of FIG. 1, N=4. Other values of N may, of course, also be used and the greater N is, the more useful will be my present improvement. Although I have shown the numerals 53–57 marked at the left they might also be repeated at the right within the scope of my invention, but since the fixed scales are always entirely visible a repetition is not necessary.

I have also marked the slide 26 with numerals to identify the scales. The scales 36–39 are marked with numerals "0," "1," "2," "3" at 58, 59, 60, 61 respectively at the left and with numerals "1," "2," "3," "4," at 62, 63, 64, 65 on the right. Here again N=4 since the scale has been divided at the fourth root of 10.

Figure 3:
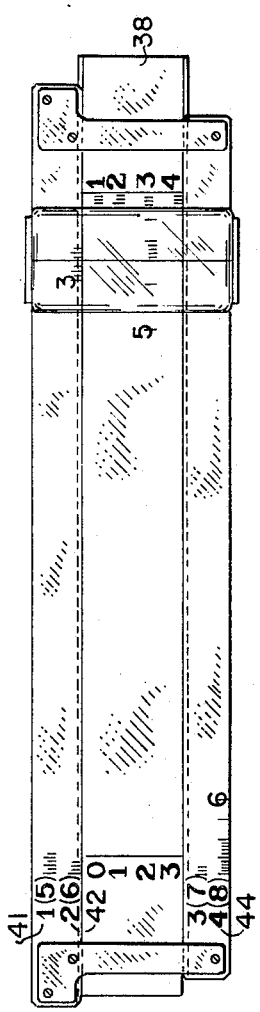
FIGURES 3 and 4 show the positions of my slide rule for calculations of multiplication and division.

The numeral markings of the scale are used as follows. In multiplication, as is well known, an answer is found by setting one of the indices of the slide at a number, marked on the fixed plate, to be multiplied and reading the desired product, on the fixed plate, at the vertical line where the other number to be multiplied appears on the slide. In my invention the proper scale for the answer is represented by the numeral that is the sum of numerals marking the scales on which appear the numbers to be multiplied. Thus if (FIGURE 3) it is desired to multiply "57" by "53" the left index is moved over the graduation "57" on scale 44 and the answer is read over the graduation "53" on scale 38 as "3021" on scale 42. The use of scale 42 to read the answer was determined as follows: scale 44 bears the numeral "4," scale 38 bears the numeral "2" (when the left hand index is used). The sum of these two numerals is "6," which represents scale 42, where the answer is read. When the right hand index 35, is used for multiplication, recourse is had to the numerals 62–65 for locating the answer according to the above method.

Figure 4:
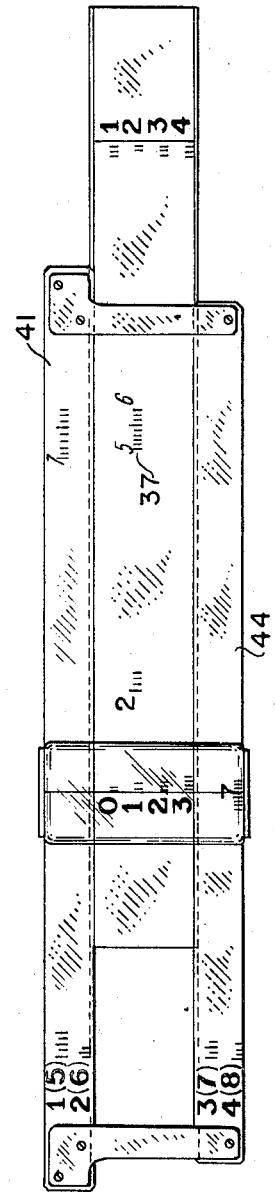

The operation of division can best be explained by recourse to another example as shown in FIGURE 4. Let us say that it is desired to divide "175" by "25." Then the graduation for "25" on scale 37 is placed under "175" on scale 41. The answer "7" appears under the left index on scale 44. In division the numeral on the slide is subtracted from the numeral on the fixed plate. In this case the numeral for the left index of scale 37 is "1" and the numeral for scale 41 is "5." Subtracting "1" from "5" results in "4" which represents the scale 44 on which the correct answer appears.

I have illustrated only one face of my slide rule 10. It is advantageous to employ conventional scales on the opposing face but such use is not required to benefit from my discoveries.

The foregoing description has been exemplary rather than definitive of my invention for which I desire an award of Letters Patent as defined in the following claim.

What is claimed is:

1. In a slide rule comprising two fixed, elongated plates, means holding said plates in parallel spaced relation, a third elongated plate slidable lengthwise between said fixed plates, left and right indices marked in equal distances on said fixed and said slidable plates, at least logarithmically spaced scale graduated on at least one of said fixed plates and on said slidable plate, said scale designating values between said right and left indices of exactly an integral root of the number 10 where the integer of said integral root is greater than 1, and a cursor comprising a hairline extending across said scales, the improvement comprising:

(A) two identifying numerals marked consecutively on each of said scales on said fixed plates, on at least one end thereof, comprising, (a) a first numeral from 1 to N, where N is said integer, corresponding to the number of the division of the total logarithmic scale associated with said numeral, and (b) a second numeral, paired with said first numeral, and equal to said first numeral plus N, and (B) identifying numerals marked consecutively on each of said scales on said slidable plate comprising, (a) consecutive numerals from 1 to (N–1) at the left of each of said slidable plate scales, and (b) consecutive numerals from 1 to N at the right of each of said slidable plate scales, each of said slidable plate scales thus having a numeral at its right end greater by 1 than the numeral at its left end, whereby the proper scale for reading the answer to a multiplication on said slide rule will correspond to the numeral that is the sum of the numerals of the scales bearing the numbers being added.

References Cited

UNITED STATES PATENTS

| | | | |
|---|---|---|---|
| 768,971 | 8/1904 | Anderson | 235—70 |
| 1,250,379 | 12/1917 | Stillman et al. | 235—70 |
| 1,364,154 | 1/1921 | Stillman et al. | 235—70 |
| 2,998,915 | 9/1961 | Wickenberg | 235—70 |

STEPHEN J. TOMSKY, Primary Examiner

S. A. WAL, Assistant Examiner

PO-1050
(5/69)

UNITED STATES PATENT OFFICE
CERTIFICATE OF CORRECTION

Patent No. 3,485,447      Dated Dec. 23, 1969

Inventor(s) William Volk

It is certified that error appears in the above-identified patent and that said Letters Patent are hereby corrected as shown below:

In claim 1, line 5, after "least" insert --one--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents